United States Patent [19]
Schettler et al.

[11] Patent Number: 5,889,662
[45] Date of Patent: Mar. 30, 1999

[54] METHOD AND APPARATUS FOR REDUCING HARMONICS MAINS-POWER-SUPPLY PERTURBATIONS OF A SELF-COMMUTATED MULTILEVEL INVENTOR

[75] Inventors: Frank Schettler; Heinz Tyll, both of Erlangen, Germany

[73] Assignee: Siemens Aktiengesellschaft, Munich, Germany

[21] Appl. No.: 862,207

[22] Filed: May 23, 1997

Related U.S. Application Data

[63] Continuation of PCT/DE95/01557, Nov. 10, 1995 published as WO96/16469, May 5, 1996.

[30] Foreign Application Priority Data

Nov. 23, 1994 [DE] Germany .......................... 44 41 758.6

[51] Int. Cl.$^6$ .............................. H02M 1/12; H02M 1/02
[52] U.S. Cl. .................................. 363/40; 363/39; 363/71
[58] Field of Search ................................. 363/39, 40, 71, 363/65, 78, 98; 323/205, 255, 340

[56] References Cited

U.S. PATENT DOCUMENTS

| | | |
|---|---|---|
| 4,264,951 | 4/1981 | Konishi et al. . |
| 4,317,166 | 2/1982 | Winkler et al. .......................... 363/138 |
| 5,065,303 | 11/1991 | Nguyen et al. ............................. 363/40 |
| 5,155,672 | 10/1992 | Brown ....................................... 363/43 |

FOREIGN PATENT DOCUMENTS

| | | |
|---|---|---|
| 0 584 322 A2 | 2/1994 | European Pat. Off. . |
| 94 16 048.1 | 3/1996 | Germany . |

*Primary Examiner*—Peter S. Wong
*Assistant Examiner*—Rajnikant B. Patel
*Attorney, Agent, or Firm*—Herbert L. Lerner; Laurence A. Greenberg

[57] ABSTRACT

A method and an apparatus for reducing harmonics mains-power-supply perturbations of a self-commutated multilevel inverter which is clocked at the fundamental frequency and has capacitive storage devices. On one hand, when a pre-determined operating point of the multilevel inverter is left, angular values for turn-on and turn-off instants of individual voltage levels of the multilevel inverter are calculated for a newly determined operating point. On the other hand, a terminal voltage of the multilevel inverter is matched to an altered fundamental amplitude of the inverter output voltage. Consequently, the harmonics mains-power-supply perturbations of a multilevel inverter can be kept to a minimum at any time.

7 Claims, 5 Drawing Sheets

METHOD AND APPARATUS FOR REDUCING HARMONICS MAINS-POWER-SUPPLY PERTURBATIONS OF A SELF-COMMUTATED MULTILEVEL INVENTOR

CROSS-REFERENCE TO RELATED APPLICATION

This application is a Continuation of International application Serial No. PCT/DE95/01557, filed Nov. 10, 1995, published as WO96/16469 May 5, 1996.

BACKGROUND OF THE INVENTION

FIELD OF THE INVENTION

The invention relates to a method for reducing harmonics mains-power supply perturbations of a self-commutated multilevel inverter installation which is clocked at the fundamental frequency and has two multilevel inverters with capacitive storage devices. The invention also relates to an apparatus for carrying out the method.

The structure of a number of self-commutated multilevel invertors which are clocked at the fundamental frequency and have capacitive storage devices is explained in German Utility Model G 94 16 048.1, corresponding to U.S. application Ser. No. 08/512,595, filed Aug. 8, 1995, in which the method of operation thereof is described in detail. A multi-level invertor of that type is used, for example, in a power factor correction device, which is referred to as "Static Var Generator (SVG)" or as "Advanced Static Var Compensator (ASVC)" or as "Static Condenser (STATCON)".

The spectrum of the three-phase invertor output voltage can be varied by selection of turn-on and turn-off instants of individual voltage levels of the multilevel invertor. The more voltage levels the multilevel invertor has, the more harmonics in the three-phase invertor output voltage can be suppressed. Thus, for example, the 11th, 13th, 23rd, 25th and 35th harmonic can be suppressed with eleven voltage levels of a twelve-pulse multilevel invertor. Consequently, the lowest harmonic which is then output into a three-phase mains power supply is the 37th harmonic. A multilevel invertor of that type produces an invertor output voltage which has a specific fundamental content.

The fundamental of the three-phase invertor output voltage defines a terminal voltage of the multilevel invertor. In practice, that determines the turns ratio of the converter transformer.

Optimum system tuning with minimum harmonics mains-power-supply perturbation consequently exists for an operating point of the multilevel invertor.

If the turn-on and turn-off instants of the individual voltage levels are then altered, the terminal voltage of the multilevel invertor is also changed. Due to that change, a mains current flows having an amplitude that has increased and a time characteristic which is distorted. Such a current can cause the multilevel invertor to turn off and can thus lead to an abrupt change in the reactive power in the three-phase mains power supply.

SUMMARY OF THE INVENTION

It is accordingly an object of the invention to provide a method and an apparatus for reducing harmonics mains-power-supply perturbations of a self-commutated multilevel invertor, which overcome the hereinafore-mentioned disadvantages of the heretofore-known methods and apparatuses of this general type and which have capacitive storage devices that solve the above-mentioned problem.

With the foregoing and other objects in view there is provided, in accordance with the invention, a method for reducing harmonics mains-power supply perturbations of a self-commutated multilevel inverter installation clocked at a fundamental frequency and having two multilevel inverters with capacitive storage devices, a transformer and a three-phase drainage coil circuit, which comprises calculating angular values for turn-on and turn-off instants of individual voltage levels of the multilevel inverters for a newly determined operating point when a predetermined operating point of the multilevel inverter installation is left; and matching a terminal voltage of the multilevel inverter installation to a change in a fundamental amplitude of the inverter output voltage.

In this way the amplitude of the mains current and the time characteristic thereof remain approximately unchanged. This eliminates turn-off of the multilevel invertor.

For each newly established operating point of a multilevel invertor, this method can be used to determine angular values for turn-on and turn-off instants of the individual voltage levels of the multilevel invertor for minimum mains-power-supply perturbations and matching change values, with the result that the invertor can remain in operation with reduced harmonics mains-power-supply perturbations.

In an advantageous method, angular values and matching change values are precalculated and stored for a plurality of operating points, with the result that only the new operating point must be determined as a function of measured values that are determined. Optimization with regard to a plurality of operating points takes place off-line.

In accordance with another mode of the invention, there is provided a method which comprises storing predetermined angular values for different operating points of the multilevel inverter installation, calling up the predetermined angular values as a function of a new operating point, and feeding the predetermined angular values as control signals to the multilevel inverters.

In accordance with a further mode of the invention, there is provided a method which comprises storing predetermined matching change values for different operating points of the multilevel inverter installation, calling up the predetermined matching change values as a function of a new operating point, and feeding the predetermined matching change values as an actuating signal to a device for matching the terminal voltage of the multilevel inverter installation to a changed fundamental amplitude of the inverter output voltage.

With the objects of the invention in view there is also provided an apparatus for reducing harmonics mains-power supply perturbations of a self-commutated multilevel inverter installation clocked at a fundamental frequency, comprising two multilevel inverters with capacitive storage devices; a three-phase drainage coil circuit connected to the multilevel inverters; a device linking the multilevel invertor installation to a three-phase mains power supply for matching a terminal voltage of the multilevel inverter installation, the device having a transformer and a tap switch; a control and regulating device generating control signals for the multilevel invertors, the control and regulating device having actual value inputs for actual current and voltage values of the multilevel inverters and of the three-phase mains power supply and a status signal of the matching device; and a control line linking the control and regulating device to the tap switch.

The apparatus for carrying out the method for reducing harmonics mains-power-supply perturbations of a self-commutated invertor having capacitive storage devices includes the device for matching the terminal voltage of this multilevel invertor to the altered invertor output voltage and a program for the existent control and regulating device of the invertor. This matching device is disposed between the three-phase outputs of the multilevel invertor and the three-phase mains power supply, and a control input and a signaling output of this device are connected to the control and regulating device.

In a further advantageous apparatus, the control and regulating device is provided with a respective memory for the angular values and for the matching change values. As a result, the multilevel invertor can be programmed off-line in a customized manner by exchanging these memories.

In accordance with another feature of the invention, the control and regulating device has a memory containing predetermined angular values for different operating points.

In accordance with a further feature of the invention, the control and regulating device has a memory containing matching change values for different operating points.

In an advantageous apparatus, the matching device is a component part of an existent converter transformer.

In accordance with a concomitant feature of the invention, there is provided a three-winding transformer having the tap switch of the matching device as a component part, secondary windings respectively linked to outputs of the multilevel inverters and a primary winding linked to the three-phase mains power supply.

Other features which are considered as characteristic for the invention are set forth in the appended claims.

Although the invention is illustrated and described herein as embodied in a method and an apparatus for reducing harmonics mains-power-supply perturbations of a self-commutated multilevel invertor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
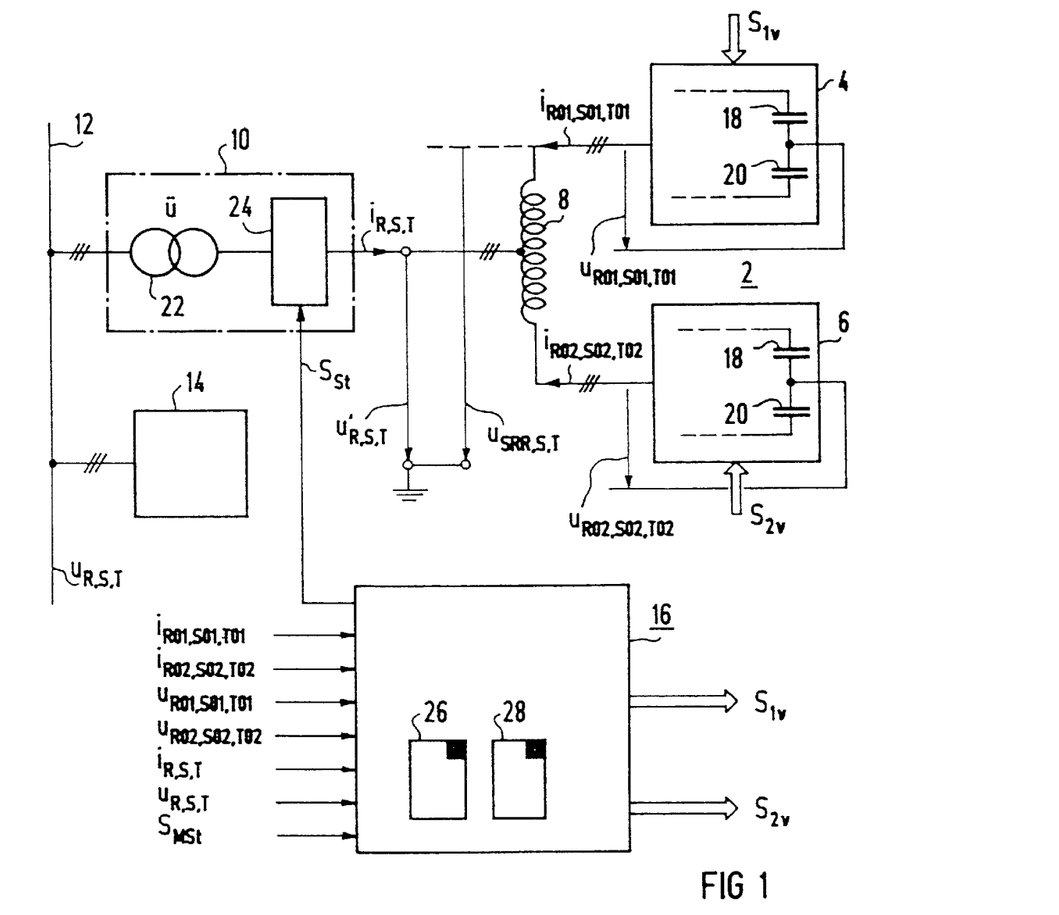
FIG. 1 is a basic schematic and block diagram of a first embodiment of an apparatus according to the invention for a multilevel invertor.

Referring now to the figures of the drawings in detail and first, particularly, to FIG. 1 thereof, there is seen a basic schematic and block diagram in which a multilevel invertor installation 2 includes two multilevel inverters 4 and 6, that are linked to one another on the output side through a three-phase drainage coil circuit 8. A three-phase output of the three-phase drainage coil circuit 8 is linked to a three-phase mains power supply 12 through a device 10 for matching a terminal voltage $u'_{R,S,T}$ of the multilevel invertor installation 2 to its variable invertor output voltage $u_{SRR,S,T}$, which is composed of respective output voltages $u_{RO1,SO1,TO1}$ and $u_{RO2,SO2,TO2}$ of the multilevel inverters 4 and 6. A further load 14 is connected to the mains power supply 12. The invertor installation 2 additionally includes a control and regulating device 16, which generates control signals $S_{1v}$ and $S_{2v}$ for the two multilevel inverters 4 and 6. The structure and the method of operation of the multilevel inverters 4 and 6 having capacitive storage devices 18 and 20 which are used herein are described in detail in German Utility Model G 94 16 048.1, corresponding to U.S. application Ser. No. 08/512,595, filed Aug. 8, 1995. The matching device 10 includes, for example, a transformer 22 and a tap switch 24 which is connected through a signal line to the control and regulating device 16.

This control and regulating device 16 generates the control signals $S1v$ and $S_{2v}$ for the multilevel inverters 4 and 6 on one hand, and an actuating signal SSt for the tap switch 24 of the device 10 on the other hand, as a function of a status signal $S_{MSt}$ of the tap switch 24 and of measured current and voltage values $i_{RO2,SO1,TO1}$, $i_{RO2,SO2,TO2}$, $i_{R,S,T}$, $u_{RO1,SO1,TO1}$, $u_{RO2,SO2,TO2}$ and $u_{R,S,T}$ of the multilevel inverters 4 and 6 and of the three-phase mains power supply 12. In order to ensure that the burden on a microprocessor of the control and regulating device 16 is reduced, this device 16 is provided with two memories 26 and 28, in which m respective angular values for turn-on and turn-off instants of m voltage levels of the multilevel inverters 4, 6 and a plurality of respective matching change values are stored for a plurality of operating points of the multilevel inverters 4, 6. The angular values and the matching change values can be calculated and optimized off-line for different installations by using these memories 26 and 28.

Figure 2:
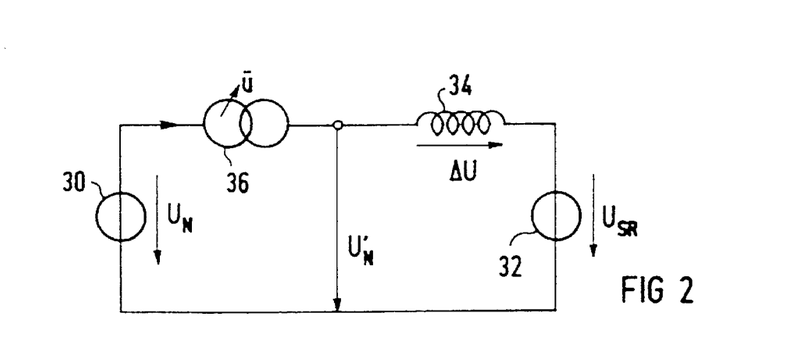
FIG. 2 is a single-phase equivalent schematic circuit diagram of the diagram according to FIG. 1.

FIG. 2 shows a single-phase equivalent circuit diagram of the three-phase apparatus according to FIG. 1. The three-phase mains power supply 12 is illustrated by a voltage source 30 which impresses a mains voltage $U_N$. The multilevel inverters 4 and 6 are likewise illustrated by a voltage source 32, which impresses an invertor output voltage $U_{SR}$. The three-phase drainage coil circuit 8 is replaced by an impedance 34, whereas the device 10 is illustrated by a transformer 36 having an adjustable turns ratio ü. The voltage source 32 impresses the voltage $U_{SR}$ for a predetermined operating point. The fundamental of this voltage $U_{SR}$ defines a terminal voltage $U'_N$ of the multilevel invertor installation 2, as a result of which the turns ratio of the transformer 36 is determined. The voltages $U'_N$ and $U_{SR}$ being impressed are coordinated with one another by the selection of the turns ratio. The three-phase terminal voltage $U'_N$ of the invertor installation 2 differs from the invertor output voltage $U_{SR}$ being impressed by a voltage drop $\Delta U$ across the impedance 34. If the angular values for turn-on and turn-off instants of the individual voltage levels of the multilevel inverters 4, 6 are then changed, the invertor output voltage $U_{SR}$ being impressed is also changed. The mains voltage $U_N$ being impressed is constant, with the result that, if the terminal voltage $U'_N$ of the multilevel invertor installation 2 is not matched to the changed invertor output voltage $U_{SR}$ being impressed, a mains current I is changed in accordance with the changing voltage drop $\Delta U$ across the impedance 34, with the result that this change in the current I can lead to the turn-off of the multilevel invertors 4, 6.

With the method according to the invention and an apparatus for carrying out this method, it is possible, when changing a predetermined operating point of the invertor installation 2, on one hand to alter the angular values for turn-on and turn-off instants of the individual voltage levels of the multilevel invertors 4, 6 in such a way that the invertor output voltage $U_{SR}$ has an optimized harmonic spectrum, and on the other hand the terminal voltage $U'_N$ of this invertor installation 2 is matched to the changed fundamental amplitude of the invertor output voltage $U_{SR}$, with the result that the mains current I is only insignificantly changed. That is to say that the harmonics mains-power-supply perturbations of a self-commutated invertor installation 2 can be kept at a minimum for any desired operating point.

Figure 3:
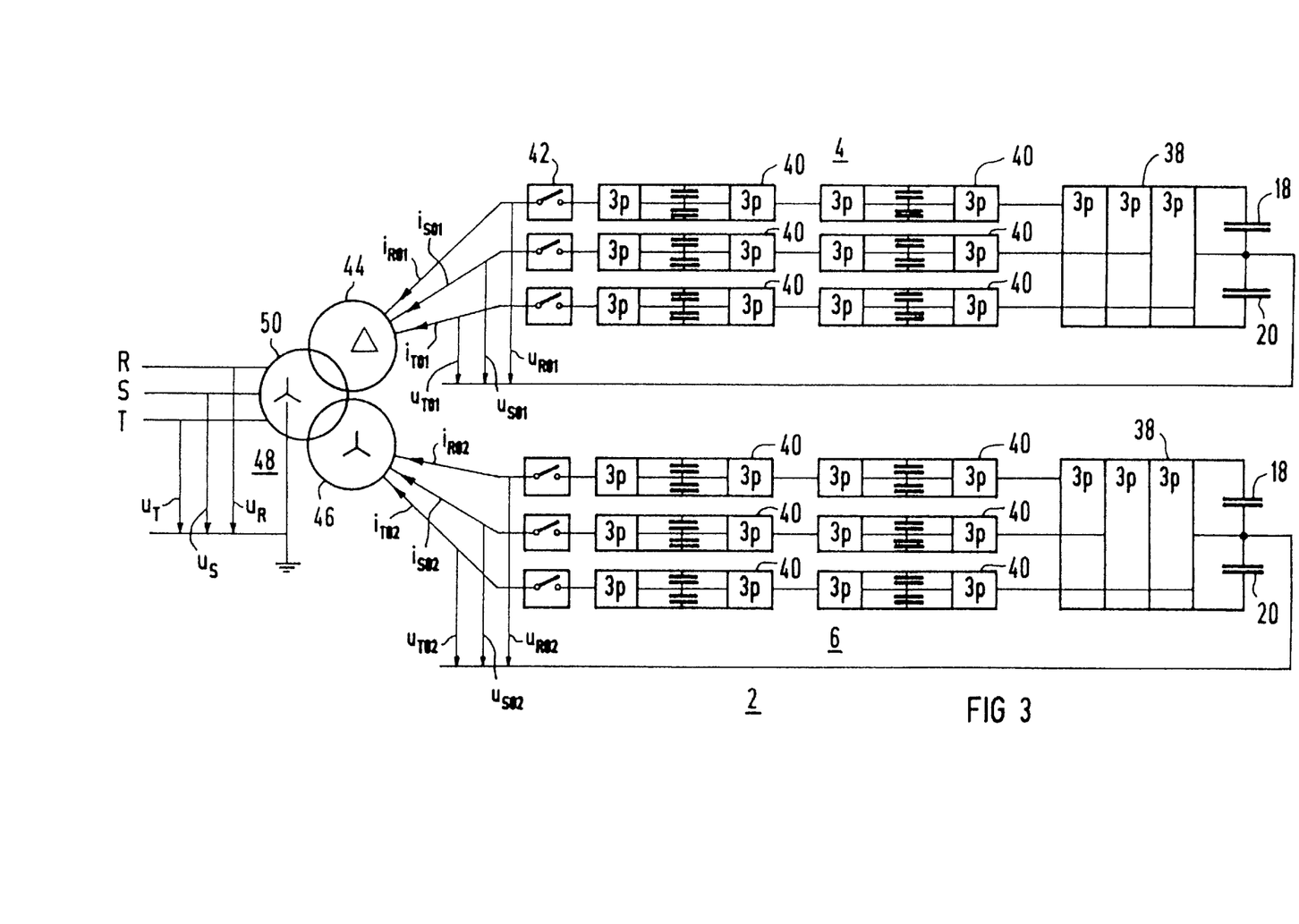
FIG. 3 is a schematic circuit diagram of an advantageous embodiment of the multilevel invertor.

FIG. 3 shows an advantageous embodiment of the invertor installation 2. Each multilevel invertor 4 and 6 includes a 6-pulse three-point invertor 38 and in each case two double cascades 40 per phase. The double cascades 40 are each provided with switching devices which are likewise of three-point structure. The outputs of the multilevel invertors 4 and 6 are each linked through a power circuit-breaker 42 to a respective secondary winding 44 and 46 of a three-winding transformer 48 having a vector group Yyd. A primary winding 50 is connected to the three-phase mains power supply 12. The use of two double cascades 40 and a 6-pulse three-point invertor 38 yields an 11-level invertor 4 and 6. Through the use of the three-winding transformer 48 having the vector group specified, a 12-pulse 11-level invertor installation 2 is produced from two 6-pulse 11-level invertors 4 and 6. The characteristic harmonics of a 12-pulse invertor installation are the 11th, 13th, 23rd, 25th, 35th, 37th, 47th, 49th, ... harmonics. Each 11-level invertor 4 and 6 additionally enables the suppression of five harmonics. This can be exploited to suppress the 11th, 13th, 23rd, 25th and 35th harmonics. For this purpose, the angular values for turn-on and turn-off instants of the eleven voltage levels of the invertor 4 and 6 are determined in such a way that the 11th, 13th, 23rd, 25th and 35th harmonics of the two 6-pulse invertors 4 and 6 are suppressed. Consequently, the invertor output voltage $u_{RO1,SO1,TO1}$ and $u_{RO2,SO2,TO2}$ of the two 6-pulse invertors 4 and 6 in each case acquires the 5th, 7th, 17th, 19th, 29th, 31st, 37th, 41st, 43rd, ... harmonics. The 5th, 7th, 17th, 19th, 29th, 31st, 41st, 43rd, ... harmonics are eliminated by virtue of the selection of the three-winding transformer 48, with the result that the lowest harmonic which is then output into the mains power supply 12 is the 37th harmonic.

Figure 4:
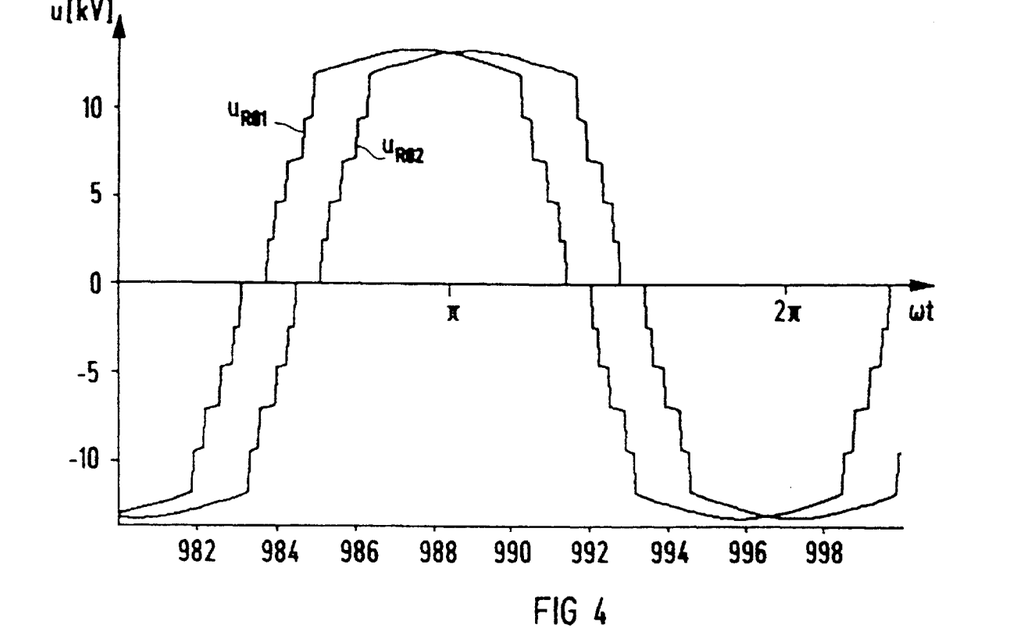
FIG. 4 is a graph illustrating a conductor neutral point voltage of two multilevel inverters of the invertor installation according to FIG. 3, plotted against time.
Figure 5:
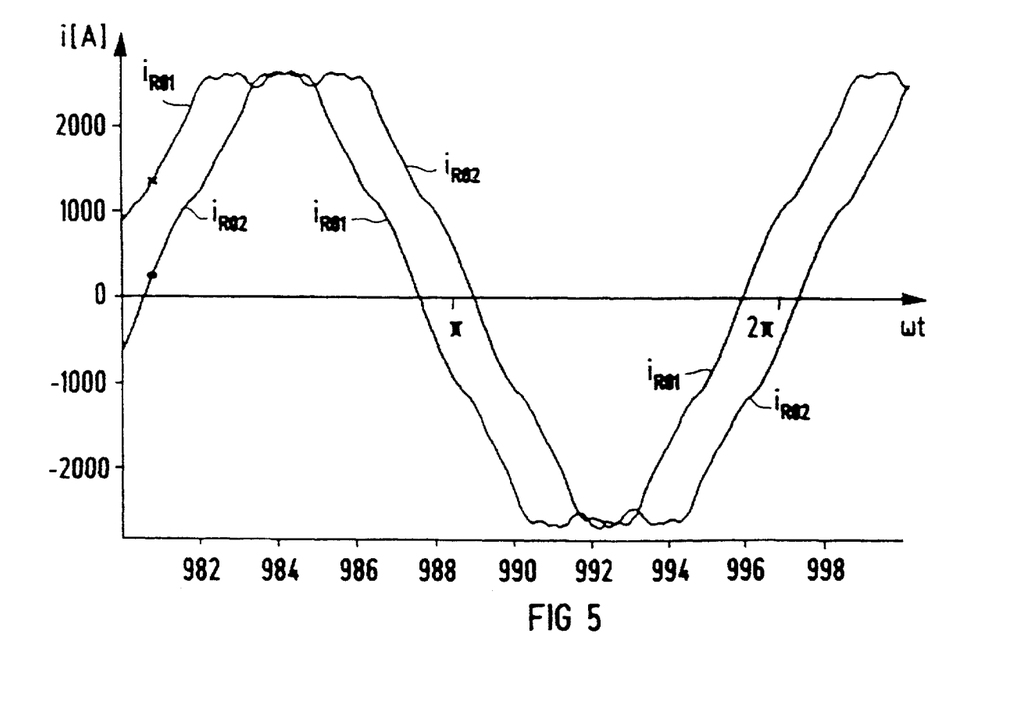
FIG. 5 is a graph illustrating associated currents, plotted against time.
Figure 6:
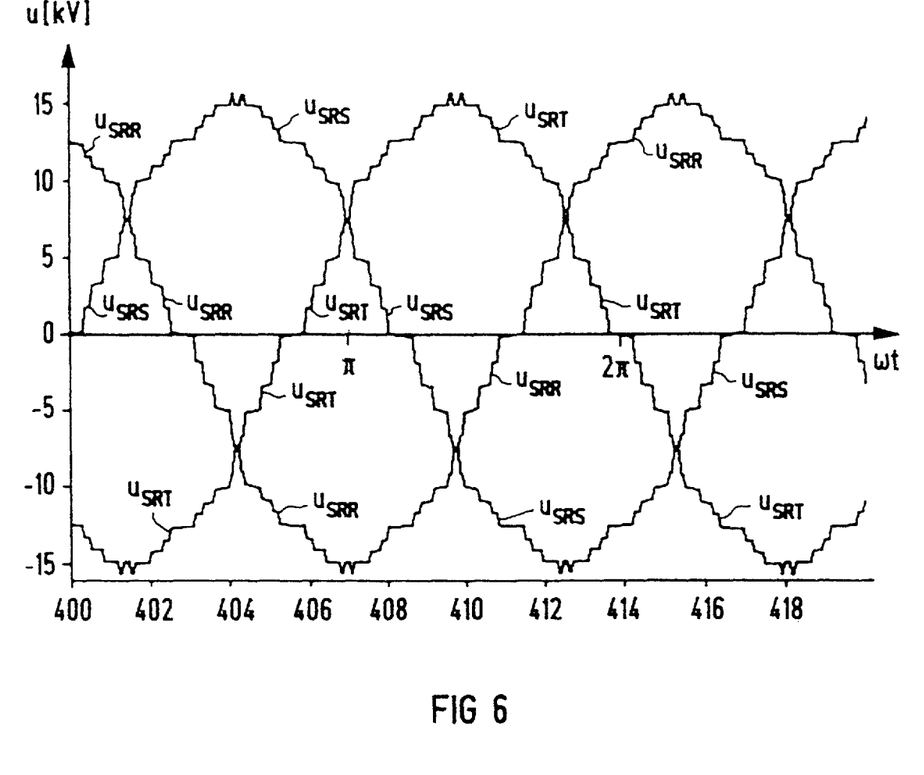
FIG. 6 is a diagram showing invertor output voltages referring to a starpoint of a three-phase mains power supply.
Figure 7:
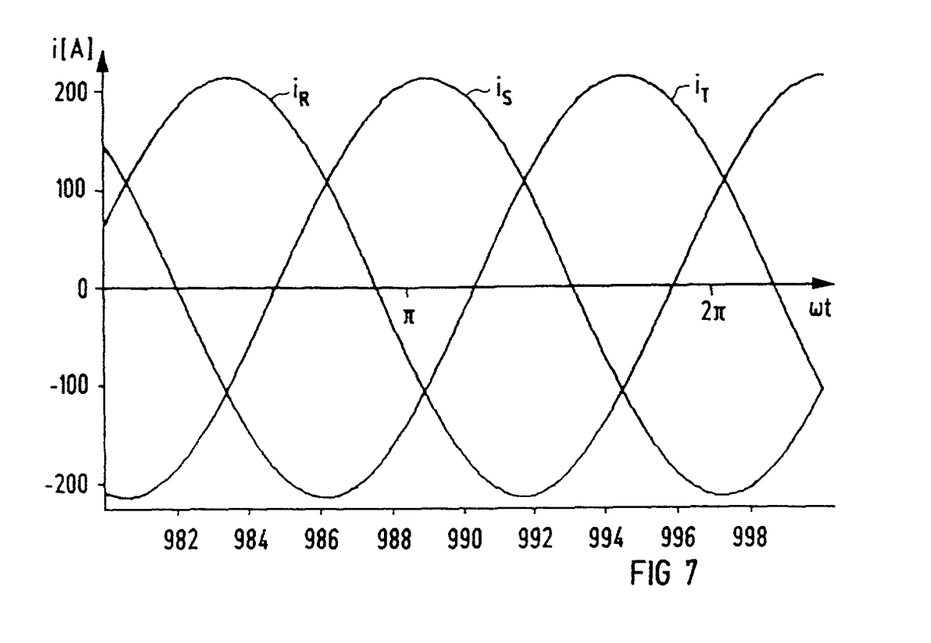
FIGS. 7 and 8 are graphs showing characteristics of the mains currents.

The associated mains current $i_{R,S,T}$ is illustrated in a diagram in FIG. 7. The conductor neutral point voltage $u_{RO1}$ and $u_{RO2}$ of the phase R of the 11-level invertors 4 and 6 is illustrated in a diagram in FIG. 4. The associated phase currents $i_{RO1}$ and $i_{RO2}$ are illustrated in a diagram in FIG. 5. The three-phase invertor output voltages $u_{SRR,S,T}$, which are formed from the output voltages $u_{RO1,SO1,TO1}$ and $u_{RO2,SO2,TO2}$ of the respective multilevel invertors 4 and 6 and are referred to a starpoint of the three-phase mains power supply 12, are illustrated in a diagram in FIG. 6.

As is shown by the diagram in FIG. 7, a mains current $i_{R,S,T}$ which has the 37th harmonic as the lowest harmonic is obtained with a 12-pulse 11-level invertor installation 2. If the outlay for the multilevel invertor installation 2 were restricted to a 7-level invertor, that is to say if a double cascade 40 was dispensed with per phase of the multilevel invertors 4 and 6, then the mains current $i_{R,S,T}$ would acquire the 25th harmonic as the lowest harmonic.

If, for example, one of the two 6-pulse 11-level inverters 4 and 6 is omitted, then the 5th, 7th, 17th, 19th, 29th, 31st, ... harmonics can no longer be eliminated with the aid of the three-winding transformer 48 having the vector group specified. That is to say that loss of a 6-pulse inverter element 4 or 6 results in the loss of the 12-pulse nature of the inverter installation 2. If the driving were then not altered, the lowest harmonic in the mains current $i_{R,S,T}$ would then be the 5th harmonic. Consequently, the harmonics mains-power-supply perturbation of the multilevel inverter installation 2 would change abruptly.

Figure 8:
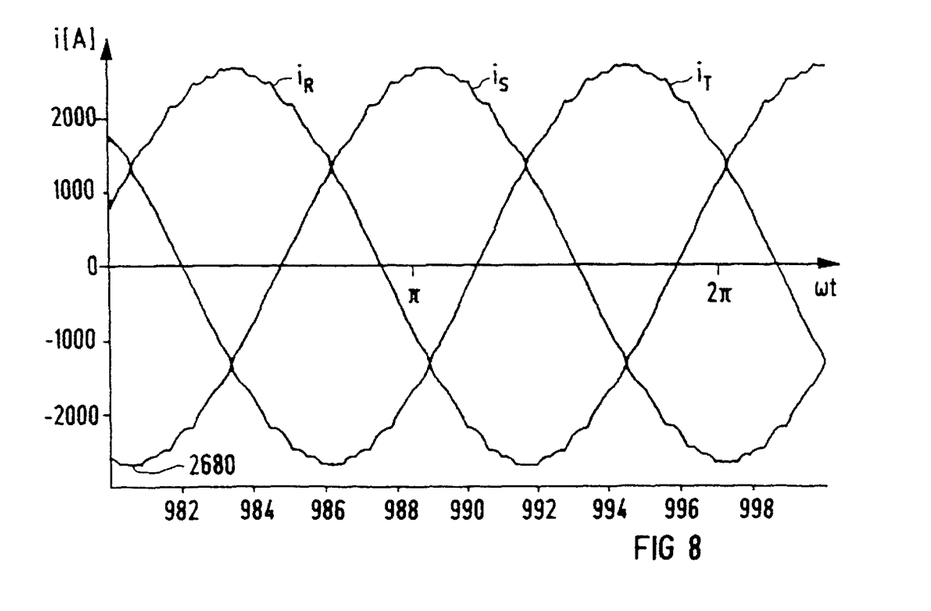

If the angular values for turn-on and turn-off instants of the eleven voltage levels of the multilevel inverter 4 or 6 are altered in such a way that the first five occurring harmonics of the 6-pulse 11-level inverter 4 or 6 are suppressed, then the lowest harmonic which is then output into the three-phase mains power supply 12 is the 19th harmonic (FIG. 8). That is to say that by changing the angular values for turn-on and turnoff instants for the eleven voltage levels of the inverter element 4 or 6, the harmonics mains-power-supply perturbation of the 11-level inverter 2 can be significantly reduced. However, this change in the drive level of the multilevel inverter 4 or 6 also effects a change in the fundamental amplitude of the inverter output voltage $u_{SRR,S,T}$. If the terminal voltage $u'_{R,S,T}$ of the inverter installation 2 is then not matched to the change in the inverter output voltage $u_{SRR,S,T}$ being impressed, the inverter installation 2 turns off due to an excessively high current I. Matching is carried out by the tap switch 24 of the device 10 or the tap switch 24 is a component part of the three-winding transformer 48. The corresponding actuating signal $S_{St}$ is calculated by the control and regulating device 16 as a function of the actual values which are present or else it is called up from a memory 28 containing precalculated values. The actual status of this tap switch 24 is signaled to the control and regulating device 16 through the use of a status signal $S_{MSt}$. In an advantageous embodiment of the apparatus, the angular values are likewise read out from the memory 26. The actual values which are present serve to determine the new operating points of the inverter 2.

With the aid of the method according to the invention and the apparatus for carrying out this method, it is now possible to keep the harmonics mains-power supply perturbations of a self-commutated multilevel inverter which is clocked at the fundamental frequency, to a minimum at any time.

We claim:

1. In a method for reducing harmonics mains-power supply perturbations of a self--commutated multilevel inverter installation clocked at a fundamental frequency and having two multilevel inverters with capacitive storage devices, a transformer and a three-phase drainage coil circuit, the improvement which comprises:

operating the multilevel inverter installation at a predetermined operating point;

subsequently, operating the multilevel inverter installation at a newly determined operating point by calculating angular values for turn-on instants of individual voltage levels of the multilevel inverters; and matching a terminal voltage of the multilevel inverter installation to a change in a fundamental amplitude of the inverter output voltage.

2. The method according to claim 1, which comprises storing predetermined angular values for different operating points of the multilevel inverter installation, calling up the predetermined angular values as a function of a new operating point, and feeding the predetermined angular values as control signals to the multilevel inverters.

3. The method according to claim 1, which comprises storing predetermined matching change values for different operating points of the multilevel inverter installation, calling up the predetermined matching change values as a function of a new operating point, and feeding the predetermined matching change values as an actuating signal to a device for matching the terminal voltage of the multilevel inverter installation to a changed fundamental amplitude of the inverter output voltage.

4. An apparatus for reducing harmonics mains-power supply perturbations of a self-commutated multilevel inverter installation clocked at a fundamental frequency, comprising:

two multilevel inverters with capacitive storage devices;

a three-phase drainage coil circuit connected to said multilevel inverters;

a device linking the multilevel invertor installation to a three-phase mains power supply for matching a terminal voltage of the multilevel inverter installation, said device having a transformer and a tap switch;

a control and regulating device generating control signals for said multilevel invertors, said control and regulating device having actual value inputs for actual current and voltage values of said multilevel inverters and of the three-phase mains power supply and a status signal of said matching device; and a control line linking said control and regulating device to said tap switch.

5. The apparatus according to claim 4, wherein said control and regulating device has a memory containing predetermined angular values for different operating points.

6. The apparatus according to claim 4, wherein said control and regulating device has a memory containing matching change values for different operating points.

7. The apparatus according to claim 4, including a three-winding transformer having said tap switch of said matching device as a component part, secondary windings respectively linked to outputs of said multilevel inverters and a primary winding linked to the three-phase mains power supply.

* * * * *

UNITED STATES PATENT AND TRADEMARK OFFICE
CERTIFICATE OF CORRECTION

PATENT NO. : 5,889,662
DATED : March 30, 1999
INVENTOR(S) : Frank Schettler

Page 1 of 1

It is certified that error appears in the above-identified patent and that said Letters Patent is hereby corrected as shown below:

Title page,
Item [54], should read as follows
-- METHOD AND APPARATUS FOR REDUCING HARMONICS MAINS-POWER-SUPPLY PERTURBATIONS OF A SELF-COMMUTED MULTILEVEL INVERTER --

Signed and Sealed this

Twenty-sixth Day of March, 2002

*Attest:*

JAMES E. ROGAN
*Attesting Officer*     *Director of the United States Patent and Trademark Office*